United States Patent Office 3,553,179
Patented Jan. 5, 1971

3,553,179
ACRYLATE-TYPE ESTERS OF PERFLUOROPOLY-OXA-ALKANEAMIDOALKYL ALCOHOLS AND THEIR POLYMERS
Philip Lee Bartlett, Wilmington, Del., assignor to E. I. du Pont de Nemours and Company, Wilmington, Del., a corporation of Delaware
No Drawing. Filed May 6, 1968, Ser. No. 727,103
Int. Cl. C08f 3/62, 15/18
U.S. Cl. 260—80.72      7 Claims

ABSTRACT OF THE DISCLOSURE

Monomers of the formula

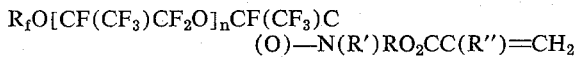

wherein $R_f$ is perfluoroalkyl, $n$ is 0–8, $R'$ is hydrogen or lower alkyl, R is alkylene, and $R''$ is hydrogen or methyl. Homopolymers of the above-described monomers and copolymers of them with vinylidene monomers. The polymers are useful as oil and water repellents and as metal corrosion inhibitors.

BACKGROUND OF THE INVENTION

(1) Field of the invention

This invention relates to acrylate-type perfluoropoly-oxa-alkaneamidoalkyl esters derived from hexafluoropropylene oxide and their polymers.

(2) Description of the prior art

Polyfluoropolyoxa-alkaneamidoalkanols are described in U.S. Pat. 3,274,244 and are slated to be useful in preparing esters such as the phosphate diesters described therein. However, carboxylate esters, especially ones derived from an unsaturated carboxylic acid, have not been prepared heretofore. It is an object of this invention to provide useful polymerizable unsaturated esters of the alkanols described above, and to provide polymers thereof. These and other objects will become apparent as described below.

SUMMARY OF THE INVENTION

This invention is directed to ester monomers of the structural formula

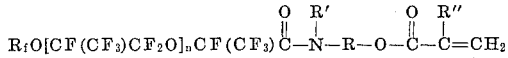

wherein $R_f$ is a perfluoroalkyl group of from 1–6 carbon atoms, $n$ is an integer of 0–8, $R'$ is hydrogen or lower alkyl ("lower" is defined herein as meaning the group can have 1–6 carbon atoms), R is an alkylene group of 2–12 atoms, and $R''$ is hydrogen or methyl.

The invention is also directed to homopolymers of the above-described ester monomers and to copolymers of the above-described ester monomers with at least one copolymerizable vinylidene monomer free of nonvinylic fluorine. Both the homopolymers and the copolymers can be defined as a polymer having recurring units derived from the above-identified ester monomer present in an amount of from about 10% to 100% by weight and recurring units derived from at least one copolymerizable vinylidene monomer free of nonvinylic fluorine present in an amount of from 0% to 90% by weight.

DESCRIPTION OF THE INVENTION

The ester monomers, as stated above, have the formula

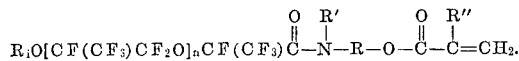

$R_f$ is exemplified by perfluoromethyl, -ethyl, -propyl, -hexyl, -pentyl and -hexyl. $R_f$ can also be branched, as for example, -isopropyl. Preferably, $R_f$ is

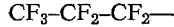

$R'$ is preferably hydrogen or methyl and most preferably hydrogen. R is preferably alkylene of 2–4 carbon atoms and most preferably is alkylene of 2 carbon atoms.

The ester monomers are prepared by esterifying the alcohol $$R_fO[CF(CF_3)CF_2O]_nCF(CF_3)CON(R')-R-OH$$

with $CH_2=C(R'')COOH$, its acid halide, or its lower alkyl esters. Esterification can take place by a number of means. Direct esterification of the alcohol with $CH_2=C(R'')COOH$ using acid catalysts, e.g., sulfuric acid or toluenesulfonic acid, may be used. One may also use titanium esters as taught by Werber U.S. Pat. 3,056,818 or Haslam U.S. Pat. 2,822,348. Esterification may also be carried out by reacting the alcohol with $$CH_2=C(R'')—COCl$$

in the presence of an acid acceptor such as a tertiary amine, e.g., pyridine. However, ester interchange is preferred and is carried out by reacting the alcohol with a lower alkyl ester of $CH_2=C(R'')COOH$, e.g., methyl acrylate or methacrylate.

The alcohol reactants,

are prepared by reacting the acid fluoride

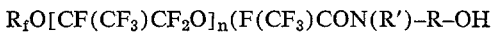

with the amino alcohol R′NH–ROH as described by Mackenzie U.S. Pat. 3,274,244. The amino alcohols R′NHROH are in most cases well known in the art. $R'$ is preferably hydrogen but can be lower alkyl, as described above. R is alkylene of 2–12 carbons, as described above. Preferably R is straight chain but may be branched; and if branched, the R′NH— and the —OH moieties must be attached to different carbon atoms of R. Representative amino alcohols include ethanolamine, 2-butylaminoethanol, 3-amino-1-propanol, 3-methylamino-1-propanol, 3-propylamino-1-propanol, 4-amino-1-butanol and 4-methylamino-1-butanol. The acid fluorides are prepared by polymerizing hexafluoropropylene oxide as taught by U.S. Pats. 3,250,808, 3,322,826 and 3,274,239 and French Pats. 1,359,426 and 1,362,548. If hexafluoropropylene oxide is polymerized alone, $R_f$ will be $CF_3CF_2CF_2—$. If it is polymerized with carbonyl fluoride, $R_f$ will be $CF_3—$. If it is polymerized with perfluoroacid fluorides, $R_f$ can be $CF_3(CF_2)_{n-1}$; and if with perfluoroketones, $R_f$ can be

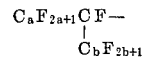

wherein $a$ and $b$ are integers whose sum is equal to $n-1$.

The polymers of this invention are useful as protective coating for metals or textiles. The homopolymers of this invention are usually insoluble in common organic solvents. They are applied to surfaces as dispersions in water or organic solvents. The copolymers are generally soluble in common organic solvents.

For use as oil and water repellents on textiles, the preferred polymers consist of from 25–90%

by weight, the remainder being one or more vinylidene monomers containing the group $CH_2=C<$ which are free of nonvinylic fluorine, i.e., fluorines attached to carbons other than that of the vinylidene group. Useful vinylidene monomers include alkyl acrylates and methacrylates, alkyl containing from one to 18 carbons, vinyl esters of aliphatic acids of one to 18 carbons, styrene, alkyl styrenes, vinyl halides, vinylidene halides, alkyl esters of aliphatic acids of 1–18 carbons, vinyl alkyl ketones, vinyl alkyl ethers, certain acrylic amides, 1,3-butadiene and its derivatives. The preferred vinylidene monomers are the alkyl acrylates or methacrylates where the alkyl group is methyl, ethyl, propyl, butyl, amyl, isoamyl, 2-ethylhexyl, octyl, decyl, dodecyl, myristyl, cetyl or octadecyl. Other useful specific vinylidene monomers include vinyl acetate, propionate, caprylate, laurate or stearate, vinyl chloride, vinylidene chloride, allyl heptanoate, acetate, caprylate or caproate, vinyl methyl ketone, vinyl ethyl ketone, vinyl methyl ether, vinyl ethyl ether, 1,3-butadiene, 2-chloro-1,3-butadiene or isoprene.

Most preferred vinylidene monomers are monomers of the formulas $CH_2=C(R'')COOH$, $CH_2=C(R'')COOR^{IV}$ or $CH_2=C(R'')CONR_2'$ wherein $R''$ and $R'$ are defined above and $R^{IV}$ is a saturated aliphatic group of 1–18 carbon atoms. Of these the $CH_2=C(R'')COOR^{IV}$ compounds are preferred.

The monomer of this invention preferred for use in the polymers are those of the formula

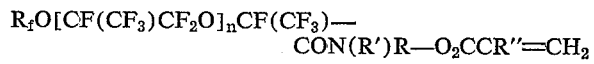

wherein $n$ is zero to two since these give the best results.

The preferred polymers can also contain from 0.1% to 1.0% by weight of units derived from a monomer chosen from $CH_2=CR''CON-HCH_2OH$,

and $CH_2=CR''CO_2R'''$ or mixtures thereof where $R''$ is H or $CH_3$ in both situations independently and $R'''$ is an epoxyalkyl group, preferably of 3–6 carbon atoms. If these copolymers are to be applied from aqueous dispersion, $CH_2=CR''CONHCH_2OH$,

or mixtures thereof are preferred. If the copolymers are to be applied from an organic medium, particularly a medium free of functionality such as hydrocarbons or halohydrocarbons, $CH_2=CR''CO_2R'''$ is preferable.

The polymers of this invention may be applied alone to textiles or they may be coapplied with vinylidene polymers. The vinylidene monomers used to prepare these vinylidene polymers are the same as those described above as being useful for preparing copolymers of the monomers of this invention. Alkyl acrylates and methacrylates as earlier described are preferred. These polymers may also contain 0.1–1.0% of units derived from the monomers $CH_2=CR''CONHCH_2OH$,

or $CH_2=CR''CO_2R'''$, as described above. When mixtures of polymers are used, the mixture may contain from 3% to 60% by weight of units derived from

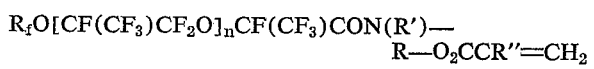

preferably 15% to 40%.

Suitable substrates for the application of the polymeric compositions of this invention are films, fibers, yarns, fabrics, and articles made from filaments, fibers, or yarns derived from natural, modified natural, or synthetic polymeric materials or from blends of these other fibrous materials and other porous materials which will absorb and transport low surface tension liquids either on their surfaces or in their interstices by capillary action. Specific representatives examples are cotton, silk, regenerated cellulose, nylon, fiber-forming linear polyesters, fiber-forming polyacrylonitrile, cellulose nitrate, cellulose acetate, ethyl cellulose, paper, fiberglass, wood pressed or otherwise hardened wood composites, metals, unglazed porcelain, porous concrete and the like. Dyed and undyed cotton sateen, poplin, broadcloth, jean cloth, gabardine and the like are especially adaptable for treatment with the compositions of this invention.

The polymeric compositions may be applied by any suitable method to the textile, e.g., dipping, spraying or the like. After evaporation of the medium, the textile is preferably cured by heating, say for a few minutes at 150–170° C.

The polymers of this invention may be prepared by either aqueous emulsion or solution polymerization using free radical initiation. Any known system for aqueous emulsion polymerization of water insoluble methacrylate esters may be used. In general, any free radical initiator may be used such as organic or inorganic peroxides or organic aliphatic azo compounds. Broadly, either cationic or anionic emulsifying agents may be used in the polymerization but nonionic agents are generally avoided. The cationic agents are preferred, particularly salts of long chain tertiary alkyl amines.

A preferred method for preparing the polymers of this invention involves preemulsification of the water insoluble monomer

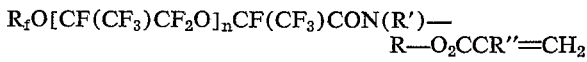

and vinylidene monomers, using dimethyloctadecylamine acetate as the dispersing agent, and then combining this emulsion with a water solution of any water soluble monomers used, the free radical initiator and, optionally, a mercaptan chain modifier, such as dodecyl mercaptan. The preferred initiator is azobis(isobutyramidine)dihydrochloride. The total monomer content in the preferred aqueous emulsion polymerization process is about 25% by weight.

The polymerization temperature, which naturally varies with the initiator being used, may vary from 40° C. to as high as 130° C. if autogenous pressure is used. The preferred azo catalyst above requires about 65° C. Higher temperatures can be attained using inorganic peroxides such as potassium persulfate, peroxyanhydrides such as benzoyl peroxide, peroxy esters, such as tert-butyl perbenzoate or ditertiaryalkyl peroxides such as ditert-butyl peroxide.

If the polymers of this invention are to contain more than 80% of units derived from

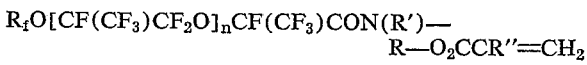

it is preferred to use a different polymerization system, a so-called aqueous dispresion polymerization system. This process is identical to that described in the previous paragraphs except that a water-insoluble initiator, preferably azobis(isobutyronitrile), is used. Polymerization temperatures and times are essentially the same as for the earlier process. While preferred for polymers containing more than 80% by weight of units derived from the monomers of this invention, this process may be used to prepare any of the polymers of this invention.

The polymers of this invention may be prepared also by solution polymerization techniques which are well known in the art. The chosen monomers and the initiators are dissolved in the solvent in a reaction vessel fitted with a stirrer and means of either heating or cooling the charge. Concentrations of the monomer and solution may vary from 5–50%. The reaction temperature is raised to between 40–100° C. to effect polymerization. When polymerization is complete, the resulting solution can be used directly for application or can be used directly after dissolving therein the other polymeric components. Useful initiators for solution polymerization are peroxide and azo compounds which are soluble in the organic solvent. These include an acyl peroxide such as benzoyl peroxide and lauroyl peroxide, organic peresters such as teritary butyl perbenzoate, dialkyl peroxides such as ditertiarybutyl peroxide and organic azo compounds such as azobis(isobutyronitrile) and azobis(2,4-dimethylvaleronitrile) and known related compounds. The concentration of initiators will usually range from about 0.1% to about 2% based on the weight of monomers. If the solvent itself or other conditions are insufficient to properly control molecular weight, small amounts of chain transfer agents such as alkanethiols with 4–12 carbons may be added. The preferred solvents for the solution polymerization of the fluorinated monomers are trichlorotrifluoroethane and tetrachlorodifluoroethane.

The preferred polymers for application to metal surfaces are those containing from 10% to about 80% by weight of units derived from the monomer $$R_fO[CF(CF_3)CF_2O]_nCF(CF_3)CON(R')—R—O_2CCR''{=}CH_2$$

from about 1% to about 10% by weight of units derived from acrylic or methacrylic acid and the remainder one of the aforementioned vinylidene monomers. Again the alkyl esters of acrylic and methacrylic acid are the preferred vinylidene monomers. These polymers are prepared by the procedures described hereinbefore although bulk polymerization may also be used. Coatings are applied to metals by means of solutions in common organic solvents such as acetone. Usually, heat curing of the coated metal is not necessary; a continuous film results on evaporation of the solvent. These films are excellent corrosion barriers, as is demonstrated in the examples below. These same polymers are also useful as metal adhesives as shown in the examples below.

The following examples illustrate the invention but are not to be interpreted as limiting the invention.

EXAMPLE 1

Preparation of $$R_fO[CF(CF_3)CF_2O]_n(CF_3)CON(R')—R—OH$$

General procedure.—A solution of 0.92 mole $$CF_3CF_2CF_2O[CF(CF_3)CF_2O]_nCF(CF_3)COF$$

in 1150 parts trichlorotrifluoroethane was cooled to 10°–15° C. Then, over a three hour period, 2.15 moles ethanolamine were added with agitation. Agitation was continued for two hours at 10–15° C. The ethanolamine hydrofluoride was collected by filtration and the filtrate was washed with water until the washings were neutral. The solution was dried over anhydrous sodium sulfate and the solvent then was evaporated at reduced pressure (1 mm. Hg at 50° C.). The product alcohols $$CF_3CF_2CF_2O[CF(CF_3)—CF_2O]_nCF(CF_3)CONHCH_2CH_2OH$$

were white waxy solids. The acid fluorides used, the product yields obtained and product analyses are given in Table 1 below. The products obtained were those denoted by the formula in the preceding sentence wherein $n$ has the value given in the Table 1 below.

TABLE 1.—REACTANT
$n\text{-}C_3F_7O[CF(CF_3)CF_2O]_n\text{-}CF(CF_3)COF$

| Product, n | Percent yield of product | Analysis F Calculated | Found | Analysis N Calculated | Found |
|---|---|---|---|---|---|
| 1 | 97.2 | 60.0 | 59.9 | 2.55 | 2.60 |
| 0 | 83.2 | 56.1 | 56.0 | 3.75 | 3.75 |
| 8 | 92.4 | 64.2 | 64.2 | 0.79 | 0.80 |
| 3 | 82.6 | 63.3 | 63.2 | 1.60 | 1.61 |

EXAMPLE 2

$$R_fO[CF(CF_3)CF_2O]_nCF(CF_3)CON(R')—R—O_2CCR''{=}CH_2$$

General procedure.—A mixture of 0.185 mole of the product obtained in Example 1, 5.0 moles methyl methacrylate, 0.02 part tetramethylhydroquinone inhibitor and 2.0 parts tetraisopropyl titanate was heated under reflux for one hour. The methanol/methyl methacrylate azeotrope was then allowed to distill slowly from the system over a 6-hour period. The mass was then cooled and the excess methyl methacrylate wash evaporated at reduced pressure. The crude ester was then dissolved in trichlorotrifluoroethane; a trace of polymer was removed by filtration and the filtrate was washed with water. After drying over anhydrous sodium sulfate, the solvent was evaporated at ca. 35° C./1 mm. Hg. The resulting esters were slightly yellow liquids. The products, analyses and yields are shown below in Table 2.

TABLE 2.—PRODUCTS
$$CF_3CF_2CF_2O[CF(CF_3)CF_2O]\text{-}_nCF(CF_3)CONH(CH_2)_2O_2CC{=}CH_2$$
$$|$$
$$R''$$

| n | R'' | Percent yield of product | Analysis F Calculated | Found | Analysis N Calculated | Found |
|---|---|---|---|---|---|---|
| 0 | CH₃ | 86.8 | 47.5 | 47.4 | 3.25 | 3.17 |
| 1 | CH₃ | 75.8 | 53.4 | 53.2 | 2.50 | 2.51 |
| 1 | * | 84.7 | 54.3 | 54.4 | 2.30 | 2.36 |
| 3 | CH₃ | 66.5 | 58.7 | 58.6 | 1.45 | 1.49 |
| 7 | CH₃ | 66.5 | 62.0 | 61.8 | 0.75 | 0.77 |

*Obtained using methyl acrylate in place of methyl methacrylate in the procedure of this example.

EXAMPLE 3

Copolymer

A mixture of 55.5 parts water, 4.6 parts of a 50% solution of N,N-dimethyloctadecylamine acetate, 0.76 part acetic acid, 20.0 parts $$CF_3CF_2CF_2OCF(CF_3)CF_2OCF(CF_3)CONHCH_2CH_2O_2CC(CH_3){=}CH_2$$

and 0.37 part n-butyl acrylate containing 10% dodecyl mercaptan was agitated until the insoluble monomers were emulsified. Then 0.15 part of 60% aqueous N-methylol acrylamide was added and the mixture was heated to 60° C. and 0.008 part azobis(isobutyroamidine) dihydrochloride was added. The polymerization was continued for four hours. The resulting polymer contained 97.7% by weight of units of $$CF_3CF_2CF_2OCF(CF_3)CF_2OCF(CF_3)—CONH(CH_2)_2O_2CC(CH_3){=}CH_2$$

1.8% of units of n-butyl acrylate and 0.5% of units of methylol acrylamide and had an inherent viscosity of 0.06 at 30° C. as a 0.5% solution in trichlorotrifluoroethane.

EXAMPLE 4

Copolymer

A polymerization was carried out using the procedure of Example 3 and the following recipe.

| | Parts |
|---|---|
| Water | 57.5 |
| 50% N,N-dimethyloctadecylamine acetate | 2.9 |
| Acetic acid | 0.5 |
| CF₃CF₂CF₂OCF(CF₃)CF₂OCF(CF₃)CONH(CH₂)₂O₂CC(CH₃)=CH₂ | 15.0 |
| Lauryl methacrylate | 5.0 |
| 2-hydroxyethyl methacrylate — 10 } weight ratio | 0.06 |
| Dodecyl mercaptan — 2 } | |
| 60% N-methylolacrylamide | 0.072 |
| Azobis(isobutyroamidine)dihydrochloride | 0.008 |

The resulting polymer contained 64.6% by weight units of fluorinated monomer of this invention, 34.9% by weight of units of lauryl methacrylate, 0.24% by weight of units of hydroxyethyl methacrylate and 0.23% by weight of units of methylolacrylamide and had an inherent viscosity of 1.80–1.82 at 30° C. as a 0.5% solution in trichlorotrifluoroethane.

EXAMPLE 5

Fabric application

Formulations of a polymer of this invention, labeled A–1, A–2, B–1 and B–2, were prepared by mixing the below-listed ingredients as follows:

The results are shown as follows:

RESULTS

| Formu- | Fabric | Oil repellency | | | Water repellency | | |
|---|---|---|---|---|---|---|---|
| lation | | Init [1] | 3SL [2] | 1DC [3] | Init [1] | 3SL [2] | 1DC [3] |
| A–1 | Blend | 4 | 4 | 3 | 80 | 80 | 70 |
| | Cotton | 4 | 0 | 4 | 80 | 70 | 70 |
| A–2 | Blend | 6 | 5 | 6 | 80 | 80 | 70 |
| | Cotton | 4 | 4 | 5 | 80 | 70 | 70 |
| B–1 | Blend | 0 | 0 | 0 | 80 | 70 | 50 |
| | Cotton | 0 | 0 | 0 | 70 | 70 | 50 |
| B–2 | Blend | 0 | 0 | 0 | 80 | 70 | 50 |
| | Cotton | 0 | 0 | 0 | 70 | 70 | 70 |

[1] Init=Initial.
[2] 3SL=after 3 standard launderings.
[3] 1DC=after 1 dry-cleaning.

FORMULATION (PERCENT ON WEIGHT OF FABRIC)

| Ingredient | A–1 | A–2 | B–1 | B–2 |
|---|---|---|---|---|
| Water repellent A (aqueous dispersion of 75% condensation product of hexamethoxymethyl melamine plus 3 moles behenic acid-25% paraffin wax) | 2.0 | 2.0 | 0 | 0 |
| Bath stabilizer 30% aqueous $\left( C_{18}H_{37}N \begin{matrix} (CH_2CH_2O)_xH \\ (CH_2CH_2O)_yH \end{matrix} \cdot HCl \right)$ $x+y=15$ | 0.35 | 0.35 | 0 | 0 |
| Water repellent B ("Phobotex" f/t/c, Ciba Corp.) | 0 | 0 | 2.0 | 2.0 |
| Crease-resistant finish ("Aerotex 23 special, Amer. Cyanamid Co.") | 5.0 | 5.0 | 5.0 | 5.0 |
| MgCl₂ | 0.5 | 0.5 | 0.5 | 0.5 |
| Curing catalyst for melamine derivative (Catalyst RB-believed to be 1 part glycollic acid plus 2 parts aluminum glycollate) | 0 | 0 | 0.35 | 0.35 |
| Polymer of this invention (13% A.I. aqueous dispersion of solids in which the solids comprise 40% fluorinated polymer of Example 3 and 60% copolymer of 99.5% 2-ethylhexyl methacrylate and 0.5% N-methylolacrylamide) | 1.5 | 2.5 | 1.5 | 2.5 |

The formulations were applied to 407 cotton poplin and a 65/35-cotton/polyester blend-Thermosol dyed tan rainwear. Bath pickups were about 50% on weight of fabric. The treated fabrics were then dried and cured for 2 minutes at 340° F. The fabrics were then evaluated for water repellency using Standard Test Method 22–1952 and for oil repellency using test method 118 T–1966, both of the American Association of Textile Chemists and Colorists.

After the oil and water repellency ratings were determined, a portion of each treated fabric sample was given three standard washings and oil and water repellency ratings were again determined. A standard washing consists of agitating the treated fabric for 40 minutes at 60° C. to 100° C. in water containing 0.1% by weight of a neutral chip soap+0.05% soda ash, rinsing with 60° C. water three times, spin drying, then pressing on each face at 300° F. ±20° F. for 30 seconds. A portion of each treated fabric sample was also given three standard dry cleanings and the oil and water repellency ratings were again determined. A standard dry cleaning consists of agitating the treated fabric for 20 minutes in tetrachloroethylene containing 2% commercial dry cleaning detergent (R. R. Street Company) and 0.5% water. The fabrics were then dried by first centrifuging for one minute followed by drying for five minutes in a tumble dryer at 160° F. The fabrics were then pressed 15 seconds on each face at 300° F. ±20° F.

EXAMPLE 6

Fabric application

Formulations C–1, C–2, D–1 and D–2 below were prepared and applied to the same cotton and blend textiles as in Example 5. The padded fabrics were air dried, cured at 300° F. for 15 minutes and then evaluated for oil and water repellency, initially and after three standard launderings and one dry-cleaning as before. The formulations and results are shown below.

| Component | Formulation (concentration on weight of fabric) | | | |
|---|---|---|---|---|
| | C–1 | C–2 | D–1 | D–2 |
| Water repellent A (same as in Example 5) | 2.0 | 2.0 | | |
| Bath stabilizer (same as in Example 5) | 0.35 | 0.35 | 0.35 | 0.35 |
| Synthrapol KB [C₁₈H₂₇O(CH₂CH₂O)₂₈H] | 0.03 | 0.03 | 0.03 | 0.03 |
| Isopropanol | 2.0 | 2.0 | 2.0 | 2.0 |
| Water repellent B (same as in Example 5) | | | 0.5 | 0.5 |
| Catalyst RB (same as in Example 5) | | | 0.35 | 0.35 |
| Permafresh 183 (permanent press resin, Sun Chemical Co.) | 12.0 | 12.0 | 12.0 | 12.0 |
| Ceranine HC (cationic fatty amide softener, Sandoz, Inc.) | 0.25 | 0.25 | 0.25 | 0.25 |
| Oil/water repellent [1] | 1.5 | 2.5 | 1.5 | 2.5 |

[1] Oil/water repellent: 13.5% A.I. aqueous dispersion of fluorinated polymer of Example 4 and copolymer of 99.5% 2-ethylhexyl methacrylate and 0.5% N-methylolacrylamide, the solids containing 40% by weight polymerized

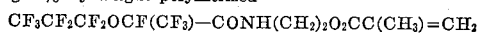

$CF_3CF_2CF_2OCF(CF_3)-CONH(CH_2)_2O_2CC(CH_3)=CH_2$

RESULTS

| Formu-lation | Fabric | Repellencies | | | | | |
|---|---|---|---|---|---|---|---|
| | | Oil | | | Water | | |
| | | Init | 3SL | 1CD | Init | 3SL | 1DC |
| C–1 | Blend | 4 | 2 | 4 | 70 | 70 | 70 |
| | Cotton | 4 | 4 | 3 | 80 | 70 | 70 |
| C–2 | Blend | 5 | 4 | 4 | 70 | 70 | 70 |
| | Cotton | 6 | 6 | 6 | 70 | 70 | 70 |
| D–1 | Blend | 4 | 2 | 3 | 70 | 80 | 70 |
| | Cotton | 4 | 4 | 4 | 70 | 70 | 50 |
| D–2 | Blend | 4 | 2 | 3 | 70 | 70 | 50 |
| | Cotton | 4 | 4 | 3 | 70 | 70 | 50 |

EXAMPLE 7

Metal application

A series of polymers were prepared by heating the monomer mixtures indicated in Table 3 below, with a trace of benzoyl peroxide for 16 hours at 80–90° C. The yields are shown in Table 3.

Test pieces of type 1020 mild steel were coated by dippling in acetone solutions of the polymers of Table 3 and then allowing the solvent to evaporate.

Each coated piece of steel was immersed in 10% aqueous hydrochloric acid at ambient temperature. The results are shown in Table 4.

Two things are apparent from Table 4. First, when units derived from the fluorine-containing monomer are not present in the polymer, the acid penetrates the film and causes considerable corrosion (Run 11). Second, when both units derived from methacrylic acid and 2-hydroxyethyl methacrylate are not present in the polymer, even though it contains units derived from the fluorine-containing monomer, the film lifts from the metal and some corrosion occurs (Run 1). In the other cases, no corrosion occurs.

ADHESIVE TEST DATA.—CONDITION OF BONDS

| Polymer, run No. | Steel to steel | Steel to aluminum | Aluminum to aluminum |
|---|---|---|---|
| 1 | Broke on flexing. | Broke on flexing. | Broke on flexing. |
| 2 | Good, could be flexed. | Good, could be flexed. | Good, could be flexed. |
| 3 | do | do | Do. |
| 5 | do | do | Do. |
| 10 | do | do | Do. |
| 11 | do | do | Do. |

The bonds using polymers from Runs 2, 3, 5, and 10 were each exposed to water at 65° C. for one hour. None were affected by such treatment. However, the metals bonded with the polymer from Run 11 failed completely after such exposure. Again, it can be seen that units derived from both the fluorine-containing monomer and methacrylic acid monomer are required in the polymer.

TABLE 3

| Run | $n$ | R | n-C$_3$F$_7$O[CF(CF$_3$)-CF$_2$O]$_n$CF(CF$_3$)CO-NH(CH$_2$)$_2$O$_2$CCR=CH$_2$ Percent (weight) | Other monomers | percent | Yield, percent |
|---|---|---|---|---|---|---|
| 1 | 1 | CH$_3$ | 50 | n-C$_4$H$_9$O$_2$CC(CH$_3$)=CH$_2$ | 50 | 99.0 |
| 2 | 1 | CH$_3$ | 45 | {n-C$_4$H$_9$O$_2$CC(CH$_3$)=CH$_2$ / HO$_2$CC(CH$_3$)=CH$_2$} | 50/50 | 99.1 |
| 3 | 1 | CH$_3$ | 75 | {n-C$_4$H$_9$O$_2$CC(CH$_3$)=CH$_2$ / HO$_2$CC(CH$_3$)=CH$_2$} | 20/5 | 97.0 |
| 4 | 1 | CH$_3$ | 20 | {n-C$_4$H$_9$O$_2$CC(CH$_3$)=CH$_2$ / HO$_2$CC(CH$_3$)=CH$_2$} | 75/5 | 98.4 |
| 5 | 0 | CH$_3$ | 20 | {n-C$_4$H$_9$O$_2$CC(CH$_3$)=CH$_2$ / HO$_2$CC(CH$_3$)=CH$_2$} | 75/5 | 99.0 |
| 6 | 0 | CH$_3$ | 25 | {Lauryl methacrylate / HO$_2$CC(CH$_3$)=CH$_2$} | 70/5 | 98.5 |
| 7 | 7 | CH$_3$ | 25 | {n-C$_4$H$_9$O$_2$CC(CH$_3$)=CH$_2$ / HO$_2$CC(CH$_3$)=CH$_2$} | 75/5 | 97.0 |
| 8 | 7 | CH$_3$ | 20 | {Lauryl methacrylate / HO$_2$CC(CH$_3$)=CH$_2$} | 75/5 | 99.0 |
| 9 | 0 | CH$_3$ | 20 | {n-C$_4$H$_9$O$_2$CC(CH$_3$)=CH$_2$ / HOCH$_2$CH$_2$O$_2$CC(CH$_3$)=CH$_2$} | 75/5 | 99.4 |
| 10 | 1 | H | 20 | {n-C$_4$H$_9$O$_2$CC(CH$_3$)=CH$_2$ / HO$_2$CC(CH$_3$)=CH$_2$} | 75/5 | 98.0 |
| 11 | | | 0 | {n-C$_4$H$_9$O$_2$CC(CH$_3$)=CH$_2$ / HO$_2$CC(CH$_3$)=CH$_2$} | 95/5 | 98.5 |

TABLE 4.—CORROSION TEST DATA

| Polymer run No. | Conditions in 10% aqueous HCl | Appearance |
|---|---|---|
| 1 | 5 days, RT | 20% corroded. |
| 2 | do | No corrosion, film intact. |
| 3 | do | Do. |
| 4 | do | Do. |
| 5 | do | Do. |
| 6 | do | Do. |
| 7 | do | Do. |
| 8 | do | Do. |
| 9 | do | Do. |
| 10 | do | Do. |
| 11 | do | 50% corroded, film lifted. |
| Control | do | Almost completely corroded. |

EXAMPLE 8

Adhesive testing

Using aluminum and type 1020 steel pieces, 0.5 x 3 x 0.01 inch, joints were prepared by coating the surfaces to be bonded with acetone solutions of the polymers of Table 3. The joints were then clamped together and the solvent evaporated in an oven at 80–90° C. After cooling, the bonds were qualitatively examined for strength. The results are shown below.

The preceding representative examples may be varied within the scope of the present total specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which are exclusive property or privilege is claimed are defined as follows:

1. A compound represented by the structural formula

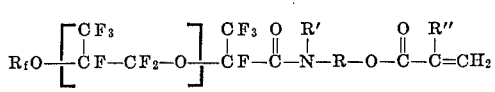

wherein R$_f$ is perfluoroalkyl of 1 through 6 carbon atoms, $n$ is an integer of 0 through 8, R' is hydrogen or methyl, R is alkylene of 2 through 12 carbon atoms, and R" is hydrogen or methyl.

2. The compound of claim 1 wherein $n$ is 0 through 2, $R'$ is hydrogen or methyl, and R is alkylene of 2 through 6 carbon atoms.

3. The compound of claim 1 having the structural formula

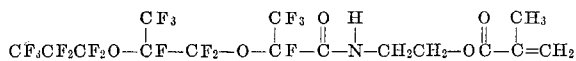

4. A polymer comprising from about 10% to 100%, by weight of the polymer, of units derived from the compound of claim 1 and from 0% to 90%, by weight of the weight of the polymer, of units derived from at least one polymerizable vinylidene monomer free of nonvinylic fluorine.

5. A polymer comprising 100% units derived from the compound of claim 1.

6. A copolymer comprising units derived from the compound of claim 1 in an amount of at least 10% by total weight, and units derived from at least one vinylidene monomer of the formula $CH_2=C(R'')COOH$, $$CH_2=C(R'')COOR^{IV}$$

or $CH_2=C(R'')CONR'_2$ wherein $R''$ and $R'$ are defined as in claim 1 and $R^{IV}$ is alkyl of 1–8 carbon atoms.

7. The copolymer of claim 6 wherein the vinylidene monomer is $CH_2=C(R'')COOR^{IV}$ wherein $R^{IV}$ is defined as in claim 6; and wherein the copolymer contains from 0.1% to 1.0% by weight of units derived from $$CH_2=CR''CONHCH_2OH$$

$CH_2=CR''CO_2CH_2CH(OH)R''$ or $CH_2=CR''CO_2R'''$ or mixtures thereof wherein $R''$ is defined as in claim 6 and $R'''$ is epoxyalkyl of 3 to 6 carbon atoms.

References Cited

UNITED STATES PATENTS

| | | | |
|---|---|---|---|
| 3,238,236 | 3/1966 | Hauptschein et al. | 260—86.1N |
| 3,274,244 | 9/1966 | MacKenzie | 260—561 |
| 3,304,278 | 2/1967 | Hauptschein et al. | 260—86.1N |
| 3,412,179 | 11/1968 | Kleiner | 260—86.1N |

HARRY WONG, JR., Primary Examiner

U.S. Cl. X.R.

117—121, 124, 132, 138.8, 139, 139.5, 145, 148, 155, 161; 260—29.6, 33.6, 33.8, 65, 80.3, 80.8, 80.81, 83.5, 86.1, 86.3, 86.7, 89.5, 486, 899, 900, 901

PO-1050
(5/69)

UNITED STATES PATENT OFFICE
CERTIFICATE OF CORRECTION

Patent No. 3,553,179     Dated Jan. 5, 1971

Inventor(s) Philip Lee Bartlett

It is certified that error appears in the above-identified patent and that said Letters Patent are hereby corrected as shown below:

Claim 1, column 10, line 70 - an "n" should appear after the bracketed portion of the formula as

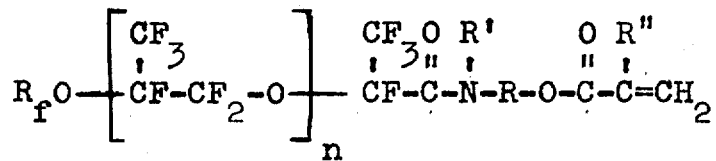

Claim 4, column 11, line 13 - the word "non-vinylic" should be hyphenated as such.

Signed and sealed this 25th day of May 1971.

(SEAL)
Attest:

EDWARD M. FLETCHER, JR.
Attesting Officer

WILLIAM E. SCHUYLER, JR.
Commissioner of Patents